United States Patent
Brown et al.

(10) Patent No.: US 6,574,601 B1
(45) Date of Patent: Jun. 3, 2003

(54) ACOUSTIC SPEECH RECOGNIZER SYSTEM AND METHOD

(75) Inventors: Michael Kenneth Brown, North Plainfield, NJ (US); Stephen Charles Glinski, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/229,809

(22) Filed: Jan. 13, 1999

(51) Int. Cl.[7] ............................ G10L 15/20; H04M 1/64
(52) U.S. Cl. .................... 704/270.1; 704/253; 704/260; 704/233; 379/80; 379/88.01
(58) Field of Search ................................. 704/233, 231, 704/251, 252, 253, 214, 248, 270.1; 379/88.01, 88.28, 410, 406, 80

(56) References Cited

U.S. PATENT DOCUMENTS

| | | | |
|---|---|---|---|
| 5,708,704 A | * | 1/1998 | Fisher ........................ 379/410 |
| 5,765,130 A | * | 6/1998 | Nguyen ...................... 704/233 |
| 5,937,379 A | * | 8/1999 | Takagi ........................ 704/233 |
| 5,956,675 A | * | 9/1999 | Setlur et al. ................ 704/231 |
| 5,978,763 A | * | 11/1999 | Bridges ...................... 704/233 |
| 5,991,726 A | * | 11/1999 | Immarco et al. ............ 704/270 |
| 6,061,651 A | * | 5/2000 | Nguyen ...................... 704/233 |
| 6,144,938 A | * | 11/2000 | Surace et al. ............... 704/257 |
| 6,173,266 B1 | * | 1/2001 | Marx et al. ................. 704/270 |
| 6,195,417 B1 | * | 2/2001 | Dans .......................... 379/67.1 |
| 6,408,272 B1 | * | 6/2002 | White et al. ............. 704/270.1 |

FOREIGN PATENT DOCUMENTS

WO 80/00757 * 4/1980 ............. G06F/3/04

OTHER PUBLICATIONS

M. Padmanabhan et al.; Speech recognition performance on a voicemaill transcription task; 1998, IEEE, pp. 913–916.*
VoiveXML Version 1.0; Boyer et al.; Voice XML Forum technical working group; Mar. 2000.*
J.F. Lynch, Jr. et al.; "Speech/Silence Segmentation for Realtime Coding Via Rule Based Adaptive Endpoint Detection", IEEE International Conference on Acoustics, Speech, and Signal Processing (1987), pp. 1348–1351.
U.S. Appln. No. 09/168,405 of Michael Brownet al., filed Oct. 6, 1998, entitled "Web–Based Platform for Interactive Voice Response (IVR)".

* cited by examiner

Primary Examiner—David D. Knepper
Assistant Examiner—Abul K. Azad (57) ABSTRACT

An adaptive endpointer system and method are used in speech recognition applications, such as telephone-based Internet browsers, to determine barge-in events during the processing of speech. The endpointer system includes a signal energy level estimator for estimating signal levels in speech data; a noise energy level estimator for estimating noise levels in the speech data; and a barge-in detector for increasing a threshold used in comparing the signal levels and the noise levels to detect the barge-in event in the speech data corresponding to a speech prompt during speech recognition.

11 Claims, 8 Drawing Sheets

ACOUSTIC SPEECH RECOGNIZER SYSTEM AND METHOD

CROSS-REFERENCE TO RELATED APPLICATIONS

This disclosure is related to U.S. patent application Ser. No. 09/168,405 of Michael Brown et al., entitled WEB-BASED PLATFORM FOR INTERACTIVE VOICE RESPONSE (IVR), filed Oct. 6, 1998.

BACKGROUND OF THE INVENTION

The present invention relates to speech recognition systems, and, more particularly, to an acoustic speech recognizer system and method.

Speech recognition systems are known which allow vocal inputs to supplement or supplant other methods for inputting data and information, for example, to computer systems. One such system is the Bell Labs Acoustic Speech Recognizer (BLASR), available from LUCENT TECHNOLOGIES, INC., which may be used to implement an Internet and/or World Wide Web browser responsive to vocal commands, as described in commonly-assigned, U.S. patent application Ser. No. 09/168,405 of Michael Brown et al., entitled WEB-BASED PLATFORM FOR INTERACTIVE VOICE RESPONSE (IVR), filed Oct. 6, 1998, which is incorporated herein by reference.

However, speech recognition systems with barge-in capabilities mix different speech during barge-in, which badgers a speech recognition server with meaningless speech packets, and so increases the processing load of the client.

SUMMARY OF THE INVENTION

An acoustic speech recognizer system integrates a barge-in detector with an adaptive speech endpoint detector for detecting endpoints; that is, the initiation and termination of speech, to permit barge-in regardless of the intensity of conflicting output speech, by using continuously adapted barge-in thresholds. Advantageously, badgering of the speech processors is avoided. The adaptive speech endpointer detector is used in speech recognition applications, such as telephone-based Internet browsers, to determine barge-in events during the processing of speech. Continuous operation may also be performed by the adaptive speech endpoint detector to implement a voice activated web browser without the need for extraneous commands such as a push-to-talk command.

More specifically, the endpointer system includes a signal energy level estimator for estimating signal levels in speech data; a noise energy level estimator for estimating noise levels in the speech data; and a barge-in detector for increasing a threshold used in comparing the signal levels and the noise levels to detect the barge-in event in the speech data corresponding to a speech prompt during speech recognition.

DETAILED DESCRIPTION

One implementation of the BLASR system operates the browser as a telephone browser to access webpages of the World Wide Web and/or the Internet using voice input and output, for example, through a plain old telephone system (POTS), cellular phones, personal communication systems (PCSs) or other telecommunication terminals, as well as for providing an optional mode of navigation with a web browser having both a keyboard and a display for a graphic user interface (GUI).

Figure 1:
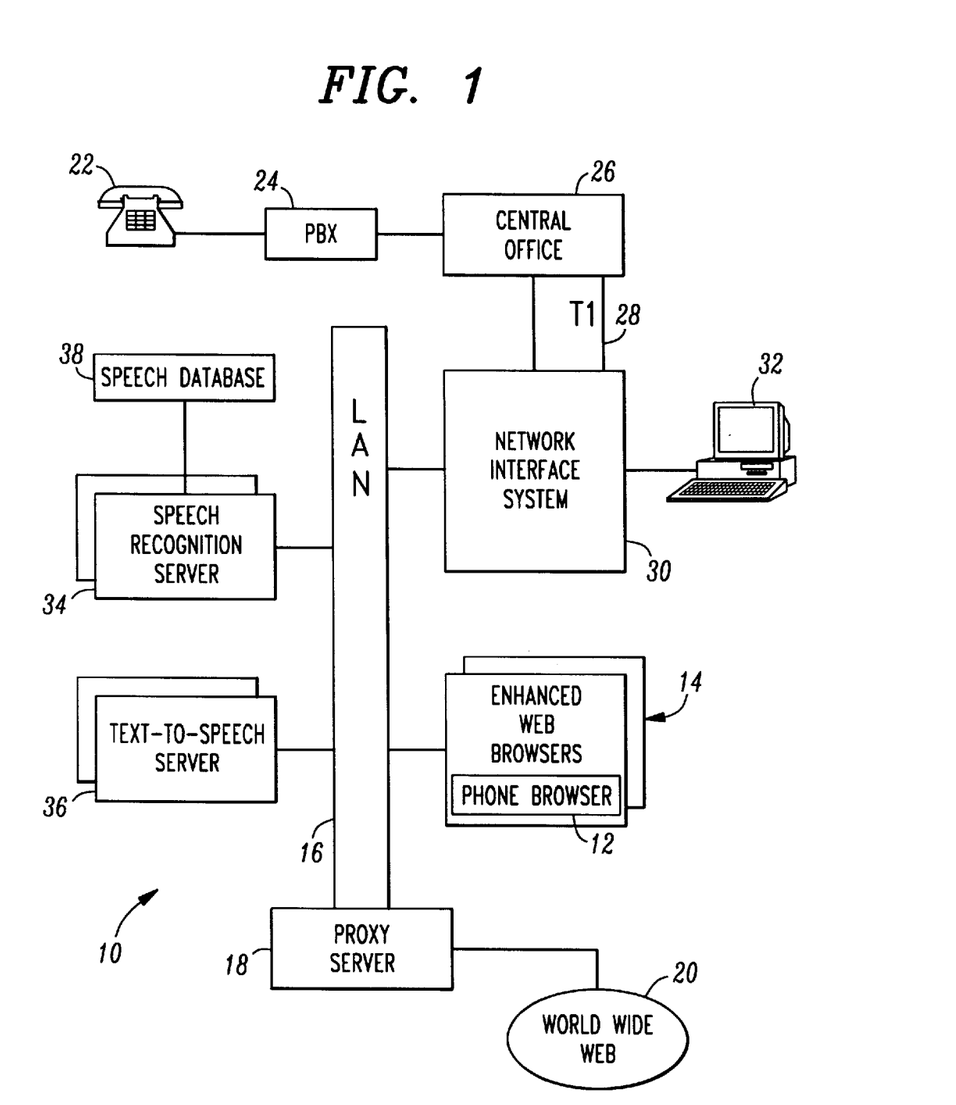
FIG. 1 illustrates a prior art phone browser system with speech recognition functions.

As shown in FIG. 1, a prior art speech/voice recognition system 10 implements a phone browser 12 as one of a set of enhanced web browsers 14 operating, for example, in a UNIX operating system environment. The phone browser 12 may establish a connection through a local area network 16 to a proxy server 18 and thence to the World Wide Web 20 or alternatively to other networks such as the Internet. The phone browser 12 is accessed by a user using a telephone 22 connected through, for example, a private branch exchange (PBX) 24 and optionally a central office 26 through network interface connections 28, such as a T1 line, to a network interface system 30. A personal computer 32 or other computing devices may also be connected to the network interface system 30 for keyboard and GUI operations. The network interface system 30 may be a UNIX-based system operating with the browsers 12–14 through the LAN 16.

For speech recognition operations, the network interface system 30 may be a known network interface provided with, or connected to, a commercially available LUCENT Speech Processing System (LSPS) for operating with the phone browser 12 as well as at least one speech recognition (SR) server 34 and at least one text-to-speech (TTS) server 36 connected to the LAN 16. A speech database 38 may also be provided and/or incorporated into the SR server 34 to support the SR functions of the SR server 34.

The voice recognition system of FIG. 1 may be implemented to routinely perform line echo cancellation and speech compression, as well as speech recognition and the capacity to performed sampled speech responses.

Figure 2:
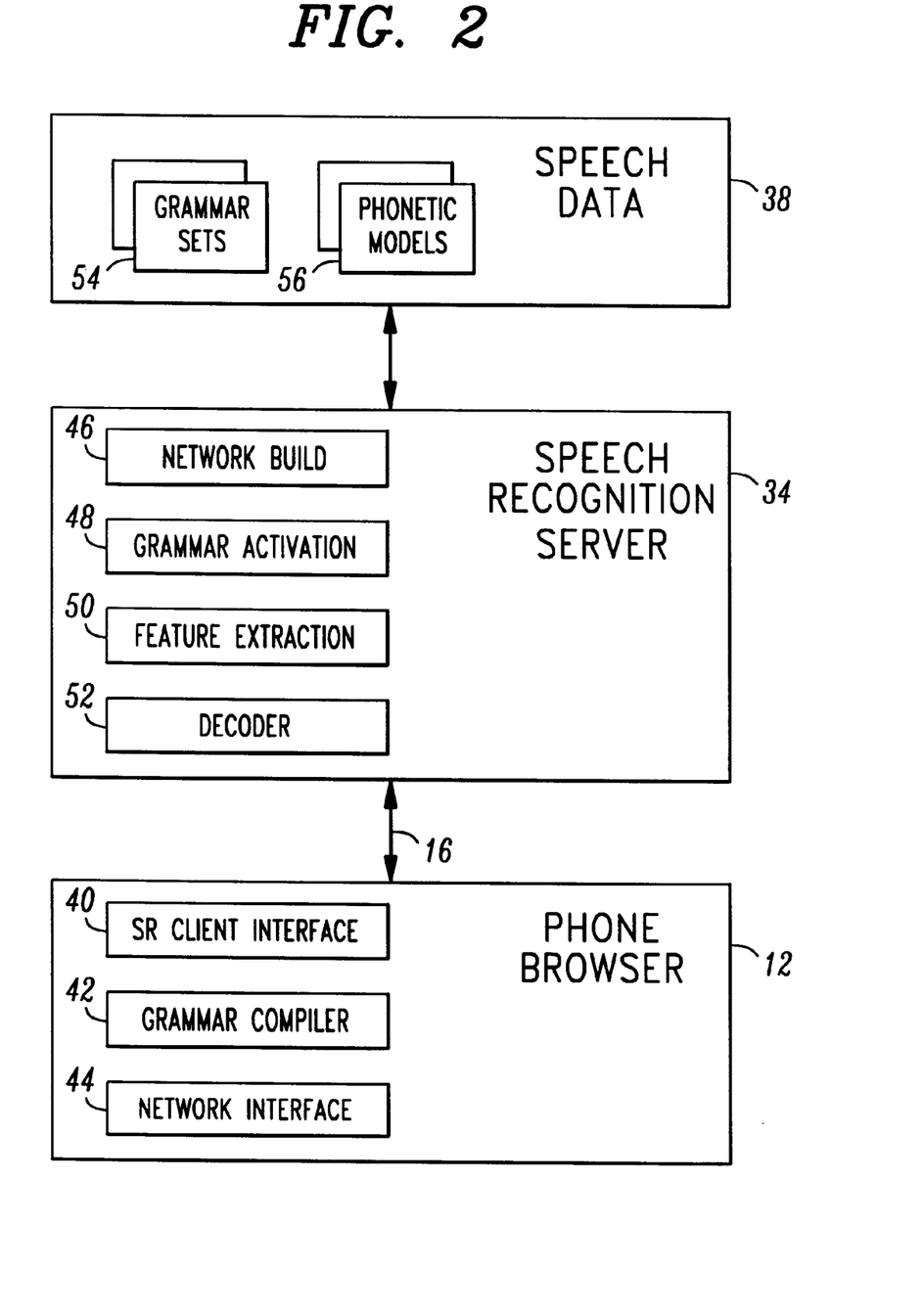
FIG. 2 illustrates the prior art phone browser of FIG. 1 in greater detail.

As shown in greater detail in FIG. 2, the prior art phone browser 12 may include an SR client interface 40, a grammar compiler 42, and a network interface 44 for connecting to the SR server 34 through the LAN 16. The SR server 34 may include a network build module 46, a grammar activation module 48, a feature extraction module 50, and a decoder 52. The SR server 34 is connected to and accesses the speech database 38 which stores at least one grammar set 54 and at least one phonetic model 56. The grammar set 54 and the phonetic model 56 may also be pre-compiled prior to access by the SR server 34. Alternatively, the grammar set 54 may be dynamically generated during run-time using the grammar compiler 42, since the grammar set 54 may not be known and/or stored in advance, such as during navigation by the phone browser 12 through different web pages on the World Wide Web 20. In addition, the network build module 46 may implement a model for creating a network of phonetic units descriptive of the currently active grammar, and the decoder 52 is used to determine a highest probability path through the generated phonetic speech network.

The phone browser 12, through the SR client interface 40, sends blocks of speech and grammar specifications to the SR server 34, and receives recognized words and reliability estimates of such recognized words.

When implementing the phone browser 12 with speech recognition capabilities, the phone browser 12 typically has to wait for a command signal from the user, such as a push-to-talk signal, which requires additional extraneous control by the user. Alternatively, a barge-in capability may be implemented which interrupts synthetic or recorded speech prompts for subsequent recognition of the barge-in speech. Once a user of the voice-activated recognition system become familiar with using the system, the user often becomes impatient with prompts, especially when the user is in a hurry to retrieve recorded messages as synthesized speech. A barge-in or cut capability enables a user to interrupt and respond to prompts before the recorded messages have finished playing, which reduces frustration, saves time, and increases user satisfaction with the voice activation system.

Typically, barge-in is performed by detecting a high volume of speech from the user to overwhelm the recorded or otherwise synthetic speech. However, such barge-in typically requires the speech recognition system to remove the synthetic or recorded speech using, for example, echo cancellers, or to attempt to recognize a special keyword or arbitrary command during simultaneous speech output, which causes meaningless packets of speech to be generated and increases the processing load on the supporting LAN 16.

Figure 3:
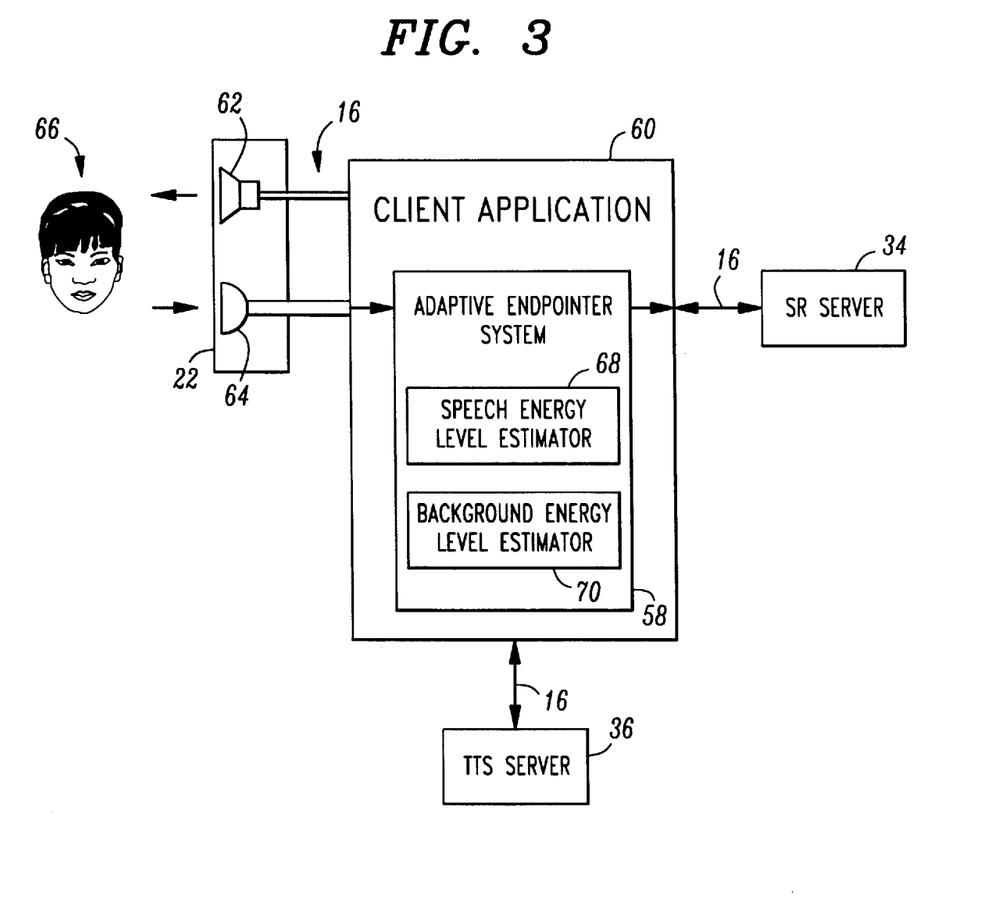
FIG. 3 illustrates the disclosed adaptive endpointer system.

Referring now to FIG. 3, the SR system and method in accordance with the invention incorporate an adaptive endpointer system 58 in a client application 60 which implements the phone browser 12 shown in FIGS. 1–2. Through the LAN 16, the client application 60 is connected to the SR server 34, the TTS server 36, and the telephone 22, which typically includes a speaker 62 and a microphone 64 for transmitting and receiving sound, respectively, to and from a user 66. The adaptive endpointer system 58 includes sample-wise level estimators, such as a speech energy level estimator 68 and a background energy level estimator 70, with both estimators 68–70 running continuously to detect the onset of speech when a speech estimate exceeds the background energy level.

Conversely, a speech endpoint, that is, the initiation and termination of speech, is detected when the background energy level exceeds a speech estimate. Such thresholding to detect speech onsets and endpoints is moderated using a hysteresis constraint. The adaptive endpointer system 58 also indicates when a barge-in event happens by detecting the higher volume speech of the user overwhelming the synthetic speech. By adaptively increasing or boosting the threshold by which the speech levels exceeding the background noise, the synthetic speech is treated as background noise while the barge-in speech is considered the speech to be processed. Therefore, barge-in speech is detected instead of the synthetic speech, and so the barge-in speech determines the speech onset. Upon such threshold boosting, a speech prompt is determined to be in progress.

The implementation of the adaptive endpointer system 58 disclosed herein in the context of the phone browser 12 in FIGS. 1–2 may be used to determine speech prompts which are used for a voice-activation configuration of the phone browser 12. Using such a phone browser 12 with the disclosed adaptive endpointer system 58, speech prompts may be generated by the voice activated web browser in conjunction with the text-to-speech (TTS) server 36 which reads text, links, and other data on an active web page.

The adaptive endpointer system 58 operates in four modes: a first mode (Mode 1) for performing processing voice speech without barge-in detection, a second mode (Mode 2) for performing barge-in with low acoustic feedback, a third mode (Mode 3) for performing barge-in with high acoustic feedback, and a zeroth mode (Mode 0) during which the endpointer system 58 is initialized. The zeroth mode is performed during the higher levels of operation of the SR system 10 and method, during which the SR server 34 and/or the TTS server 36 are started or stopped, and during which commands and parameters are received from the user or from input control files.

Figure 4:
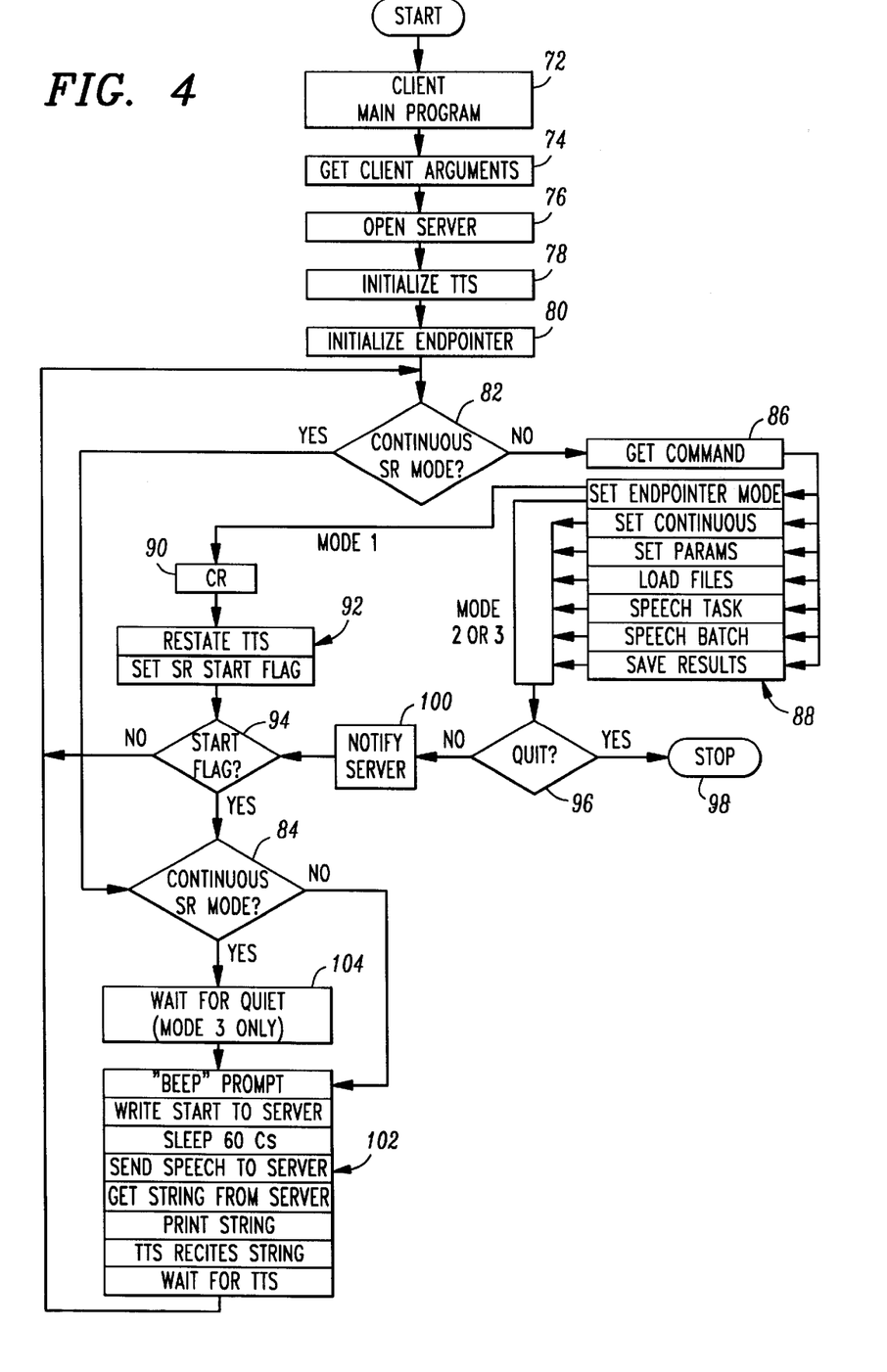
FIG. 4 illustrates a flowchart of the main operating program.

As shown in FIG. 4, the higher levels of operation are performed by a main client program which starts in step 72, and performs the steps of getting client arguments/operating parameters in step 74, opening the SR server 34 in step 76 for further operations, initializing the TTS server 36 in step 78, and initializing the adaptive endpointer system 58 in the zeroth mode in step 80. In particular, the zeroth mode of the adaptive endpoint system 58 is entered in step 180 to perform the initialization. The main client program then proceeds to step 82 to determine if the SR system 10 is in a continuous SR mode in step 82. If so, the main program proceeds to step 84. Otherwise, the main program waits to receive a command in step 86, and acts on the received command. The command may be one of a set of command in step 88, such as the steps of setting the mode of the endpointer system 58 to one of the first, second, or third modes; setting the endpointer system 58 for continuous operation; setting a set of parameters; loading files; performing speech tasks; performing speech data batch processing; or saving the results of other command functions.

The received command to set the endpointer mode to the first mode may be a specific command in step 90 such as a carriage return (CR) or other inputs such as actuation of the ENTER or RETURN keys on a keyboard or actuation of a specific icon through the phone browser 12. In response to such a command in step 90, the main program restarts the TTS server 36 and sets a SR start flag in step 92, and then determines if a start flag has been set in step 94. If not, the main program proceeds to step 82. Otherwise, the main program proceeds to step 84. Alternatively, the first endpointer mode may be the default operating mode of the endpointer system 58. An endpointer mode flag or register is thus set to indicate the first mode.

Referring back to step 88, the command for setting the endpointer mode may correspond to either the second or third endpointer mode, and thus the endpointer mode flag or register is set to indicate the respective chosen mode. In one embodiment, the user is given the opportunity to select and change the endpointer operating mode. In alternative embodiments, the endpointer operating mode is fixed during implementation of the overall SR system and method, for example, by compilation of source code specifying a predetermined endpointer operating mode configuration for processing speech.

After the step 88, if it is determined in step 96 that a command has been entered to quit the main program and thus to stop the SR functions, the main program stops in step 98. Otherwise, the main program notifies the SR server 34 in step 100 to prepare for SR processing, and the main program determines if the start flag is set in step 94. The main program then branches to steps 82 or 84 accordingly.

When step 84 is performed, the main program either branches to step 102 if the continuous SR mode is not set, or the main program branches to step 104 to wait for a quiet state if the continuous SR mode is set, as indicated by the endpointer flag or register storing the current mode setting. Step 104 is described in greater detail with reference to FIG. 6. Otherwise, the main program proceeds to step 102, in which a number of functions are performed such as the output of a "beep" prompt, the writing of a start value or setting to the SR server 34, the entry into a 60 cycle "sleep" mode, or other functions such as sending speech to the SR server 34, getting a data string from the SR server 36, printing the string, receiving the string using the TTS server 36, and waiting for the TTS server 36. The main program then loops back to step 82 to continuous speech processing.

Figure 5:
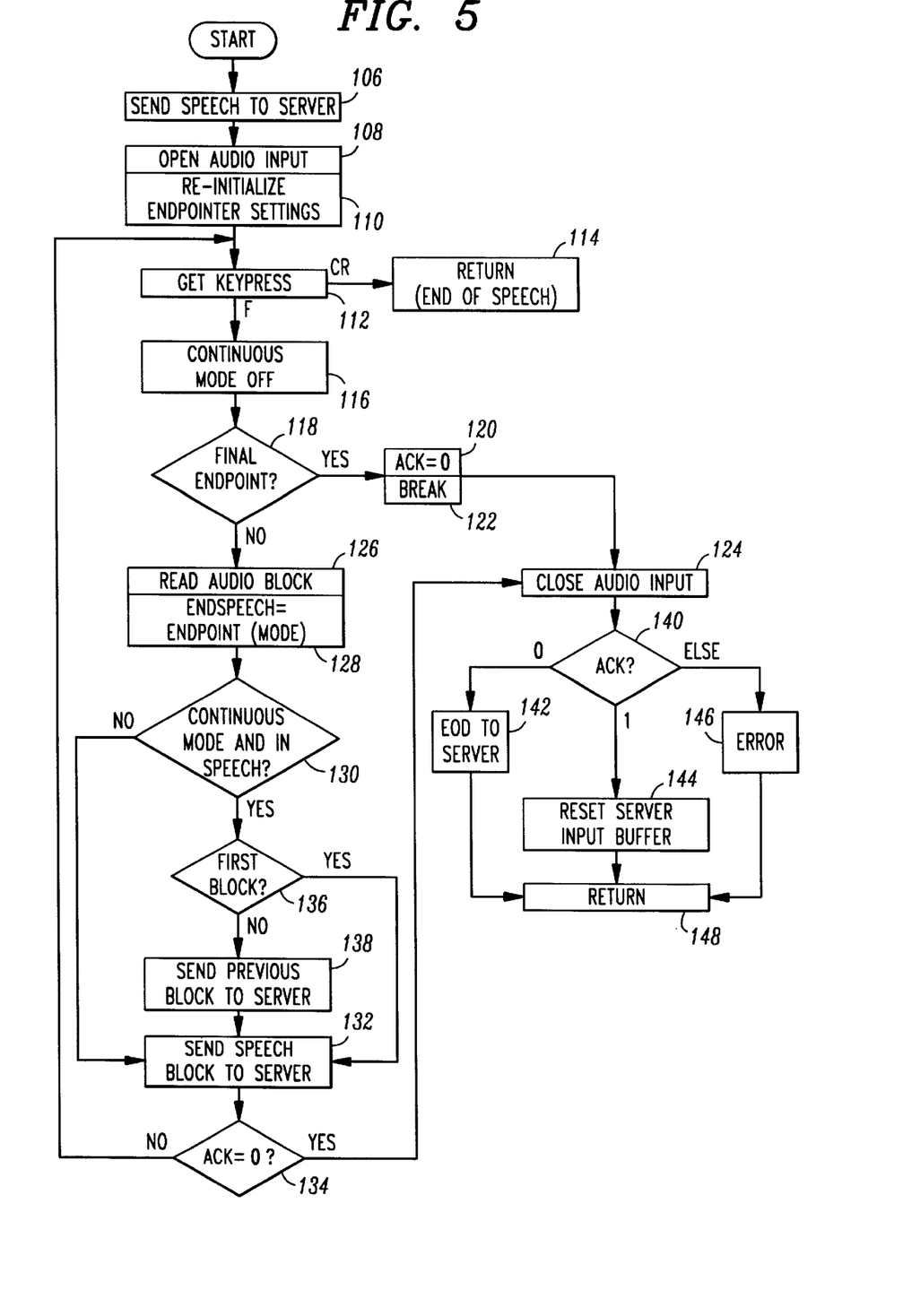
FIG. 5 illustrates a flowchart of a send-speech routine.

During step 102, the step of sending speech to the SR server 34 is shown in greater detail in FIG. 5, in which the procedure starts in step 106 and proceeds to open the audio input in step 108, for example, by receiving speech from the user 66 through the microphone 64 of a telephone 22 as in FIG. 3. Also, the parameters and settings of the endpointer system 58 are re-initialized in step 110, in which the buffers are set up and/or cleared in memory for new speech processing. After step 110, the endpointer system 58 is invoked to arbitrate the delivery of speech blocks to the SR server 34.

Since the speech may be sent to the SR server 34 in either a continuous or a non-continuous processing mode, a keypress is detected in step 112. A predetermined command such as a carriage return (CR) may indicate the end of a speech session, so such a keypress in step 112 causes the routine in FIG. 5 to return in step 114 to either perform the remaining steps in step 102 of FIG. 4 and/or to loop back to step 82. Alternatively, a second predetermined command may be input in step 116 to toggle a continuous mode setting or flag, with such toggling being actuated, for example, by pressing the key "F" to turn the continuous (forever) speech processing mode off in step 116.

It is understood that, instead of or in addition to keyboard inputs, actuation of icons on a graphic user interface (GUI) of the phone browser 12 may be implemented to control the settings and operation of the endpointer system 58.

After step 116, the endpointer system 58 determines if there is a final endpoint in the processed speech in step 118. If so, the acknowledgment (ACK) flag is set to zero in step 120 and a break signal is generated in step 122 to stop the speech processing, and the routine proceeds to step 124, as described herein. Otherwise, if no final endpoint is detected in step 118, a block of audio data is read in step 126, and the end of the speech is determined in step 128 to be an endpoint according to the mode of operation of the endpointer system 58; that is, the detection or non-detection of barge-in between the first, second, and third modes described herein determines the endpoint and the end of the processed speech in step 128.

The condition of both continuous mode being set and the processing of the speech being within the speech data; that is, in an IN SPEECH state, is determined in step 130. If neither condition is present, the endpointer system 58 sends the speech block being processed to the SR server 34, and the ACK flag is determined in step 134 to be zero or not. However, if both conditions in step 130 are met, the routine determines in step 136 if a first block is being processed. If not, the routine proceeds to step 132. However, if a first block is being processed, the previous speech block is sent to the SR server 34. The routine then proceeds to steps 132–134.

In step 134, if the ACK flag is not set to zero, the routine loops back to step 112 to detect for further keypresses or other user inputs. Otherwise, after step 134, if the ACK flag is equal to zero, the routine proceeds to step 124 to close the audio input from the telephone 22. Error checking and recovery is then performed, in which the ACK flag is checked in step 140 to be equal to 0, 1, or other values, from which steps 142–146 are performed, respectively, to send an end of data (EOD) signal to the SR server 34, to reset the input speech buffer of the SR server 34, or to generate and output an error message, respectively. After each of steps 142–146, the routine performs step 148 to return to step 102 and thence to step 82 in FIG. 4.

Figure 6:
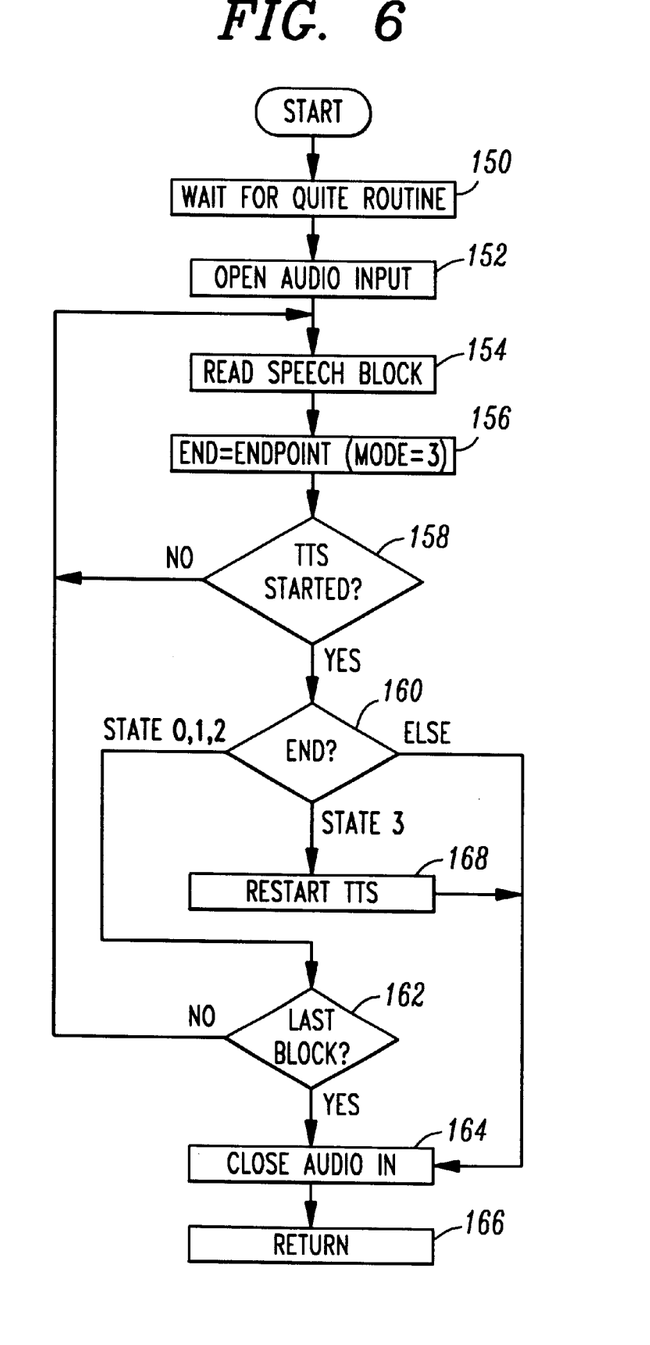
FIG. 6 illustrates a flowchart of a wait-for-quiet routine.

Referring back to FIG. 4, if the endpointer system 58 is in the third endpointer mode as determined step 84, a wait-for-quiet routine is initiated in step 104, which performs the routine shown in FIG. 6 to perform barge-in with high acoustic feedback, such that live speech is not sent to the SR server 34 without also implementing an echo canceller device in the endpointer system 58. The echo canceller device is used to mitigate feedback from prompting speech for the voice-activated phone browser 12, and/or is used in implementations which experience a "cocktail party" effect which degrades the signal-to-noise ratio (SNR) of the live speech input.

In FIG. 6, the wait-for-quiet routine starts in step 150, and opens the audio input from the telephone 22 in step 152. A speech block is read in step 154, and the end of the speech block is set to the endpoint in step 156 as determined by the endpointer system 58 operating in the third mode, described in greater detail herein. The routine then determines in step 158 if the TTS server 36 is activated to start TTS processing. If not, the routine loops back to step 154 to continue receiving the speech blocks. Otherwise, in step 158, if the TTS server 36 is prepared to perform TTS processing, the routine determines in step 160 if the speech block has reached an end, as determined from the state of the endpointer system 58 described in greater detail herein with respect to FIG. 10.

Figure 8:
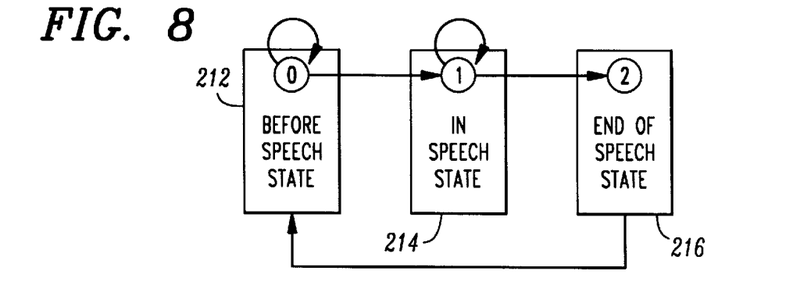
FIG. 8 illustrates a state diagram of a first operating mode.
Figure 9:
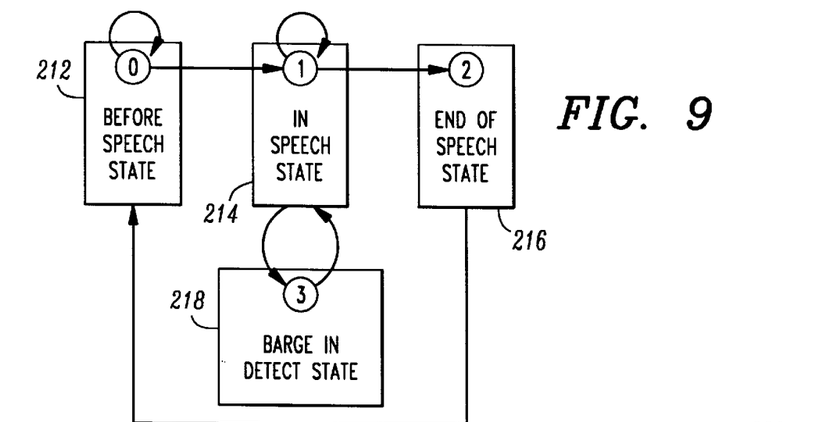
FIG. 9 illustrates a state diagram of a second operating mode.
Figure 10:
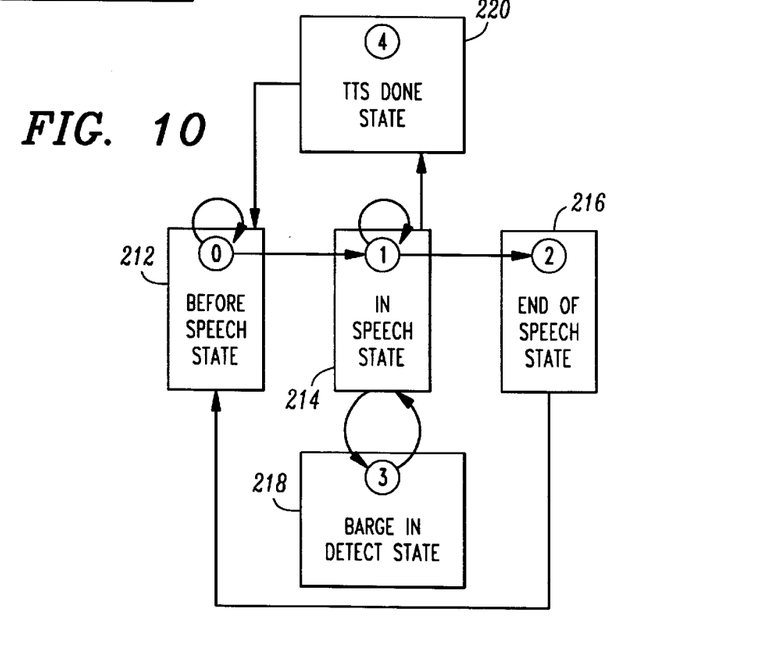
FIG. 10 illustrates a state diagram of a third operating mode.

When the endpointer system 58 is in the zero, first, or second states as described herein with reference to FIGS. 8–10, the routine in FIG. 6 determines in step 162 if a last block of speech has been processed. If not, the routine loops back to step 154; otherwise, the routine proceeds to step 164 to close the audio input and then to return in step 166 to proceed to step 102 in FIG. 4. Referring back to step 160, if the endpointer.system 58 is in the third state, the TTS server 36 is restarted in step 168, and the routine proceeds to step 164–166.

Figure 7:
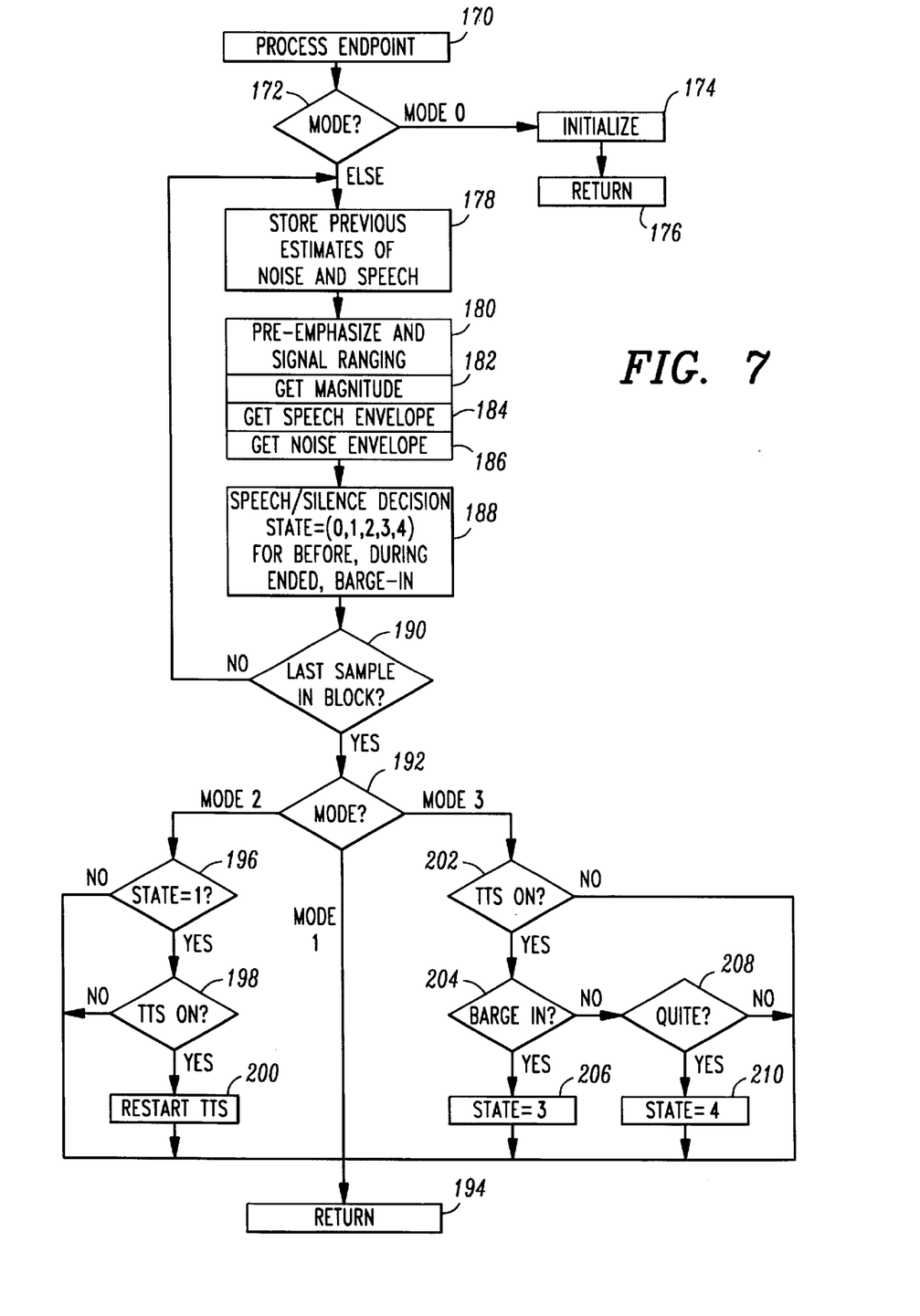
FIG. 7 illustrates a flowchart of operation of the adaptive endpointer system.

The operation of the endpointer system 58 is invoked in steps 128 and 156 after audio/speech blocks are read in steps 126 and 154 in FIGS. 5–6, respectively. The endpointer system 58 is also invoked during initialization in step 80 of FIG. 4. Referring to FIG. 7, the endpointer system 58 operates by starting the real-time endpoint detection process in step 170, and by determining the endpointer mode in step 172 in which the endpointer system 58 is currently operating. If the mode is set to the zeroth mode, as in step 80, the endpointer system 58 performs step 174 to be set up with initial operating configurations, and thence to enter the first endpointer mode as the default operating mode. The endpointer system 58 then returns in step 176 to perform post-initialization endpointer operations by proceeding to step 82 in FIG. 4 and waiting for further invocation by steps 128 and 156.

Otherwise, in step 172, if the mode is the first, second, or third endpointer mode, the endpointer system 58 stores any previously determined estimates of noise and speech in a memory, and then performs pre-emphasis and signal ranging of the signals from the audio/speech blocks. For input audio stream data i(k), with k being a sample index or time parameter, the audio data stream is pre-emphasized by a high pass filter over, for example, a two-point window or range of audio data to generate filtered data v(k) according to:

$$v(k)=i(k)-\alpha i(k-1) \quad (1)$$

to increase the discrimination between the speech and noise signals. The filter parameter $\alpha$ may be pre-set or may be adaptively adjusted. For example, for increased signal/noise discrimination, $\alpha=0.95$.

The endpointer system 58 then determines the magnitude of the filtered data v(k) in step 182 to generate magnitude values u(k) according to:

$$u(k)=|v(k)| \quad (2)$$

and a speech or signal energy level estimate s(k) of the speech envelope is determined in step 184 using a speech energy level estimator 68 by bridging over intersyllabic gaps in the speech while quickly tracking the peak speech energy in a fast attack manner. The estimate s(k) may be assigned an arbitrary start value such as u(k), and the estimate s(k) is recursively refined according to the production rules in Equations (3)–(4):

$$\text{if } s(k)<u(k) \text{ then } s(k):=u(k) \quad (3)$$

$$\text{if } s(k)>u(k) \text{ then } s(k):=(1-B_S)u(k)+B_S s(k-1) \quad (4)$$

in which the assignment operation ":=" is used to indicate a recalculation of s(k) based on the production rules. The parameter $B_S$ is a signal decay time constant, which may be set, for example, to 0.9992. Such a value for $B_S$ provides a decay rate of about 150 ms. at about 8 kHz. By recursive approximation in repeatedly applying the production rules in Equations (3)–(4), the signal energy level estimate s(k) can be determined within a pre-set tolerance.

The endpointer system 58 then generates a noise level estimate n(k) of the noise envelope in step 186 in fast decay using the background energy level estimator 70. The estimate n(k) may be assigned an arbitrary start value such as u(k), and the estimate n(k) is recursively refined according to the production rules in Equations.(5)–(6):

$$\text{if } n(k)<u(k) \text{ then } n(k):=u(k) \quad (5)$$

$$\text{if } n(k)\geq u(k) \text{ then } n(k):=(1-B_N)u(k)+B_N n(k-1) \quad (6)$$

with the parameter $B_N$ being a noise decay time constant, which may be set, for example, to 0.9922. Such a value for $B_N$ provides a decay rate of about 16 ms. at about 8 kHz. By recursive approximation in repeatedly applying the production rules in Equations (5)–(6), the noise level estimate n(k) can be determined within a pre-set tolerance.

Since the noise estimate is still perturbed when speech is present, and since speech spurts rarely last more than two seconds, the noise level estimate n(k) can be deterred from increasing to the speech level by determining a modified (true or well-behaved) noise level estimate tn(k) from the production rules in Equations (7)–(8), after initial assignments of tn(k) to an arbitrary start value such as n(k):

$$\text{if } tn(k)<n(k) \text{ then } tn(k):=(1-B_T)n(k)+B_T tn(k) \quad (7)$$

$$\text{if } tn(k)\geq n(k) \text{ then } tn(k):=n(k) \quad (8)$$

with the parameter $B_T$ being a true noise decay time constant, which may be set, for example, to 0.999975. Such a value for $B_T$ provides an attack rate of about 5 seconds. By recursive approximation in repeatedly applying the production rules in Equations (7)–(8), the true noise level estimate tn(k) can be determined within a pre-set tolerance.

After determining the speech and noise estimates in steps 184–186, respectively, using the production rules in Equations (3)–(8), the endpointer system 58 determines a speech/silence decision in step 188 using the following production rules in Equations (9)–(11), with the appropriate state of the state machine of the endpointer system 58, described with reference to FIGS. 8–10, being set to one of the states indicated by the numbers 0–4 in step 188 according to the corresponding speech/silence decision.

Using the estimates s(k) and tn(k), $$\text{if } s(k)>T_S tn(k)+T_{MIN} \text{ then Inspeech} \quad (9)$$

$$\text{if } s(k)<T_N tn(k)+T_{MIN} \text{ then Innoise} \quad (10)$$

$$\text{if } (T_N tn(k)+T_{MIN}\leq s(k)) \text{ and } (s(k)\leq T_S tn(k)+T_{MIN}) \text{ then Dead Zone} \quad (11)$$

in which $T_S$ is a signal hysteresis threshold having, for example, the value of 2. $T_N$ is a global noise threshold or floor having, for example, the value of 1.414, and $T_{MIN}$ is a minimum threshold which may be set, for example, to be 40 dB below a peak of a largest allowable input signal s(k). Inspeech is a state in which speech is present, corresponding to the first state, and Innoise is a state in which speech is not present which is determined to be the zeroth state if the previous state is not the first state having speech present, or is determined to be the second state if the previous state is the first state having speech present. The Dead Zone state indicates no change of the current state, such that the zeroth state loops back to itself, the first state loops back to itself, and the second state transitions to the zeroth state, as shown in FIGS. 8–10. Such speech/silence processing and decision determinations are described, for example, in R. Crochiere et al., "Speech/Silence Segmentation for Real-Time Coding via Rule Based Adaptive Endpoint Detection", IEEE INTERNATIONAL CONFERENCE ON ACOUSTICS, SPEECH, AND SIGNAL PROCESSING (1987), pp. 1348–1351.

In addition, the disclosed endpointer system 58 determines barge-in states in step 188 according to the production rules in Equations (12)–(13). During operation in the second mode for barge-in detection with low acoustic feedback:

$$\text{if } s(k)>T_S tn(k)+T_{MIN}+T_{TTS} \text{ then state}:=3 \quad (12)$$

in which $T_{TTS}$ is an adaptive prompt threshold for text-to-speech processing. The value of the prompt threshold $T_{TTS}$ may be adaptively modified by the measuring the maximum audio levels at the microphone 64 when the TTS server 36 is active, and setting the value of $T_{TTS}$ to the maximum value. In performing such adaptive processing, the user 66 is not to speak during the adaptation interval, and so step 188 may include controlling the endpointer system 58 to deactivate the microphone 64 during the adaptation interval.

During operation in the third mode:

$$\text{if } s(k)<T_{BN} tn(k)+T_Q \text{ then state}:=4 \quad (13)$$

in which $T_{BN}$ is a noise hysteresis threshold, and $T_Q$ is a quiet threshold. The third mode is optional to address any high acoustic feedback in the microphone 64 which may produce erroneous recognition results when no echo cancellation is employed to minimized the feedback, and even when echo cancellation is active which places a processing strain on the SR server 34 causing performance to be compromised. The operation in the third mode using the determination in Equation (13) is an option used in cases in which the duration and onset of a spoken prompt is not previously known.

After performing the decision determination in step 188, the endpointer system 58 proceeds to step 190 in FIG. 7 to determine if the last sample of speech in the block has been processed. If not, the method loops back to step 178. Otherwise, with the last sample processed, the endpointer system 58 determines the current mode in step 192 to further process the speech block. If the endpointer system 58 is in the first mode and is operating with the states shown in FIG. 8, the method returns the decided state in step 194.

If the endpointer system 58 is in the second mode operating with the states shown in FIG. 9, the method determines in step 196 if the decided state is the first state. If the endpointer system 58 is not in the first state, the decided state is returned in step 194. Otherwise, after step 196, in the first state, the endpointer system 58 determines in step 198 if the TTS server 36 is operating, for example, during barge-in detection if the endpointer system 58 transitions to the third state. If not, the endpointer system 58 returns the first state in step 194 for processing without the TTS server 36 being restarted. However, in the first state with the TTS server 36 operating in step 198, the method proceeds to step 200 to restart the TTS server 36 with the endpointer 58 in the first state, in which speech has been detected, for further processing with the TTS server 36, and the method proceeds to step 194. Restarting the TTS server 36 means that barge-in causes a suspension of the audio output of the TTS server 36.

Referring to step 192, if the third mode is set, the method determines in step 202 if the TTS server 36 is operating. If not, the method returns the current state by proceeding to step 194. Otherwise, with the TTS server 36 operating, the method determines if a barge-in condition is detected in step 204. If so, the endpointer system 58 proceeds to step 206 to process the speech in the third state, and the method returns to step 194. However, if no barge-in is detected in step 204, a quiet state is determined in step 208 corresponding to step 104 in FIG. 4. If no quiet is detected, the endpointer system 58 proceeds to step 194 to process the barge-in condition at the current state. Otherwise, if quiet is detected during the barge-in condition in step 208, the endpointer system 58 proceeds to step 210 to process the speech in the fourth state, and the method returns in step 194 in the fourth state.

As described herein, the endpointer system 58 operates a state machine in different modes, as shown in FIGS. 8–10. In FIG. 8, the endpointer system 58 operates in the first mode for speech processing without barge-in, with the zeroth state 212 being before speech is detected, which loops to itself until speech is detected in the first or inspeech state 214. While speech is present and being processed in the first state 214, the first state 214 loops to itself until the processed speech ends. The endpointer system 58 then proceeds to the second or end-of-speech state 216, and then transitions to the zeroth state 212 until more speech is detected and processed.

In the second mode shown in FIG. 9 for barge-in processing with low acoustic feedback, when speech is being processed in the first state 214, if barge-in is detected and the endpointer system 58 transitions to the third state 218, the speech processing of the TTS server 36 is terminated so that the barge-in condition may be addressed without interruption or interference from other speech processing and speech data. After the third state 218, the endpointer system 58 transitions to the first state 214 such that live speech may be sent to the SR server 34 for processing until the end of speech occurs, and then the endpointer system 58 transitions to the second state 216.

The third mode shown in FIG. 10 is performed with an additional fourth state for: barge-in processing with high acoustic feedback, for example, to prevent live speech from being sent to the SR server 34 unless an echo canceller is employed. When speech is being processed in the first state 214, if barge-in is detected, the endpointer system 58 transitions to either the third state 218 or the fourth state 220, as described above in reference to steps 202–210 in FIG. 7.

By the foregoing a novel and unobvious adaptive endpointer system 58 and method has been disclosed. However, numerous modifications and substitutions may be made without departing from the spirit of the invention. Accordingly, the invention has been described by way of illustration rather than limitation.

What is claimed is:

1. A system for use in speech recognition wherein a user receives a synthetic or recorded speech prompt from a text-to-speech (TTS) server via at least one network, comprising:

a client application for communicating, via the at least one network, with a speech recognition (SR) server, the TTS server, and, at a location of the user, a microphone;
wherein:
said client application enables the SR server to receive speech data provided by the user via the microphone; and
said client application determines whether the TTS server is operating, where the TTS server outputs a speech prompt when it is operating, and, if it is determined that the TTS server is operating, the client application operates in a state where it determines whether barge-in speech has been detected by processing an audio input received via the microphone, and, if it is determined that the TTS server is not operating, the client application operates in a state where it does not determine whether barge-in speech has been detected.

2. The system of clam 1, wherein:
if said client application determines that the TTS server is operating but no such barge-in speech has been detected, said client application waits and determines whether the TS server is quiet, indicating that the TTS server is no longer operating.

3. The system of claim 2, wherein:
if said client application determines that the TTS server is quiet, the client application transitions from the state where it determines whether barge-in speech has been detected to the state where it does not determine whether barge-in speech has been detected.

4. The system of claim 1, wherein:
the client application is implemented as a state machine.

5. The system of claim 1, wherein:
the audio input is processed using a signal energy level estimator for estimating signal levels thereof, and a noise energy level estimator for estimating noise levels thereof.

6. A method for use in speech recognition wherein a user receives a synthetic or recorded speech prompt from a text-to-speech (TTS) server via at least one network, comprising:

providing a client application for communicating, via the at least one network with a speech recognition (SR) server, the TTS server, and, at a location of the user, a microphone;
wherein the client application enables the SR server to receive speech data provided by the user via the microphone; and determining whether the TTS server is operating, where the TTS server outputs a speech prompt when it is operating, and, if it is determined that the TTS server is operating, operating the client application in a state where it determines whether barge-in speech has been detected by processing an audio input received via the microphone, and, if it is determined that the TTS server is not operating, operating the client application in a state where it does not determine whether barge-in speech has been detected.

7. The method of claim 6, wherein:

if the client application determines that the TTS server is operating but no such barge-in speech has been detected, said client application waits and determines whether the TTS server is quiet, indicating that the TTS server is no longer operating.

8. The method of claim 7, wherein:

if the client application determines that the TTS server is quiet, the client application transitions from the state where it determines whether barge-in speech has been detected to the state where it does not determine whether barge-in speech has been detected.

9. The method of claim 6, wherein:

the client application is implemented as a state machine.

10. The method of claim 6, wherein:

the audio input is processed using a signal energy level estimator for estimating signal levels thereof, and a noise energy level estimator for estimating noise levels thereof.

11. A computer readable medium for use in speech recognition, wherein a user receives a synthetic or recorded speech prompt from a text-to-speech (TTS) server via at least one network, comprising:

software which is executable to:

(a) provide a client application for communicating, via the at least one network, with a speech recognition (SR) server, the TTS server, and, at a location of the user, a microphone;

wherein the client application enables the SR server to receive speech data provided by the user via the microphone; and (b) determine whether the TTS server is operating, where the TTS server outputs a speech prompt when it is operating, and, if it is determined that the TTS server is operating, operating the client application in a state where it determines whether barge-in speech has been detected by processing an audio input received via the microphone, and, if it is determined that the TTS server is not operating, operating the client application in a state where it does not determine whether barge-in speech has been detected.

* * * * *